US008699956B2

(12) United States Patent
Mow et al.

(10) Patent No.: US 8,699,956 B2
(45) Date of Patent: *Apr. 15, 2014

(54) POLYPHASE SEQUENCES FOR WIRELESS COMMUNICATIONS

(75) Inventors: Wai Ho Mow, Hong Kong (CN); Jianhua Sun, Munich (DE)

(73) Assignee: Kan Ling Capital, L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,732

(22) Filed: May 29, 2012

(65) Prior Publication Data

US 2012/0236952 A1    Sep. 20, 2012

Related U.S. Application Data

(63) Continuation of application No. 12/183,005, filed on Jul. 30, 2008, now Pat. No. 8,208,858.

(51) Int. Cl.
*H04B 1/02* (2006.01)

(52) U.S. Cl.
USPC .............................. 455/63.4; 455/39; 455/91

(58) Field of Classification Search
USPC .................... 455/63.4, 39, 91, 120, 125, 507; 342/73, 372
See application file for complete search history.

(56) References Cited

U.S. PATENT DOCUMENTS

| 5,115,243 | A | 5/1992 | Perry et al. |
| 5,128,683 | A | 7/1992 | Freedman et al. |
| 5,151,702 | A | 9/1992 | Urkowitz |
| 7,453,794 | B2 | 11/2008 | Fang et al. |
| 7,760,821 | B2 | 7/2010 | Cherubini et al. |
| 7,826,559 | B2 * | 11/2010 | Al-Dhahir et al. ............. 375/299 |
| 8,208,858 | B2 * | 6/2012 | Mow et al. .................... 455/63.4 |
| 8,249,513 | B2 * | 8/2012 | Niu et al. ..................... 455/63.4 |
| 2006/0203932 | A1 | 9/2006 | Palanki et al. |

OTHER PUBLICATIONS

Mow, "A new Unified Construction fo Perfect Root-of-Unity Sequences" Spread Spectrum Techniques and Applications Proceedings, 1996., IEEE 4th International Symposium, vol. 3, pp. 955-959.*

J.A.C. Bingham. "Multicarrier modulation for data transmission: an idea whose time has come." Commun. Mag., vol. 28, No. 5, pp. 5-14, May 1990. http://wsl.stanford.edu/~ee359/ofdm_bingham.pdf. Last accessed Jun. 7, 2011, 8 pages.

(Continued)

*Primary Examiner* — Sonny Trinh

(74) *Attorney, Agent, or Firm* — Amin, Turocy & Watson, LLP

(57) ABSTRACT

Polyphase sequence generation is provided for sequences having good aperiodic correlation properties. The sequences can allow lengths not attainable by other types of sequences (such as Frank sequences) and can yield increase merit factors and more desirable peak-to-side-peak ratios (and therefore decreased sidelobe energy) than other sequences (such as Chu sequences). Perfect root-of-unity sequences of lengths up to 32, achieving the minimum phase alphabets and the maximum merit factors and/or peak-to-side-peak ratios, are searched, and the results are tabulated. Comparing the merit factors and peak-to-side-peak ratios of the best search results to other sequences, a common construction pattern of the improved sequences of length $2m^2$ are obtained. The improved sequences can be utilized in a variety of configurations, including spread spectrum communication, radar, channel estimation, system identification, and/or the like.

20 Claims, 14 Drawing Sheets

(56) References Cited

OTHER PUBLICATIONS

J. Hou, et.al. "Preamble Sequence for Fast Cell Search, Low Computational Complexity, and Low PAPR. Proposal to IEEE 802.16 Broadband Wireless Access Working Group," http://ieee802.org/16, 2004. http://wirelessman.org/tge/contrib/C80216e-04_265r1.pdf. Last accessed Oct. 16, 2008, 18 pages.

"IEEE Standard for Local and Metropolitan Area Networks—Part 16: Air Interface for Fixed Broadband Wireless Access Systems." IEEE Computer Society and the IEEE Microwave Theory and Techniques Society. IEEE Std.802.16, 2004. http://standards.ieee.org/getieee802/download/802.16-2004.pdf. Last accessed Oct. 16, 2008, 895 pages.

U. Ladebusch, et al. "Terrestrial DVB (DVB-T): a broadcast technology for stationary portable and mobile use", IEEE Proc., vol. 94, No. 1, pp. 183-193, Jan. 2006. http://www.tijbc.com/pruebas-7419/I0782913.pdf. Last accessed Jun. 7, 2011, 11 pages.

E. Mozeson, et al. "MATLAB Code for Plotting Ambiguity Functions." IEEE Trans. Aerospace and Electronic Systems, vol. 38, pp. 1064-1068, 2002. http://www.eng.tau.ac.il/~nadav/pdf-files/mtlb_amb.pdf. Last accessed Oct. 16, 2008, 5 pages.

J. Zhuang, et al. "GCL-Based Preamble Design for 1024,512 and 128 FFT Sizes in the OFDM PHY Layer." Proposal to IEEE 802.16 Broadband Wireless Access Working Group. http://ieee802.org/16, dated Aug. 29, 2004, 30 pages.

Mow, "A Unified Construction of Perfect Polyphase Sequences", Information Theory, 1995. Proceedings., 1995 IEEE International Symposium on Issue Date: Sep. 17-22, 1995, on p. 459.

Pereira, et al., "Generalized Chu Polyphase Sequences", Ins. De Telecomun., Univ. de Coimbra, Coimbra, Portugal, This paper appears in: Telecommunications, 2009. ICT '09. International Conference on Issue Date : May 25-27, 2009, on pp. 47-52.

OA dated Oct. 25, 2011 for U.S. Appl. No. 12/183,005, 12 pages.

Notice of Allowance dated Feb. 28, 2012 for U.S. Appl. No. 12/183,005, 14 pages.

* cited by examiner

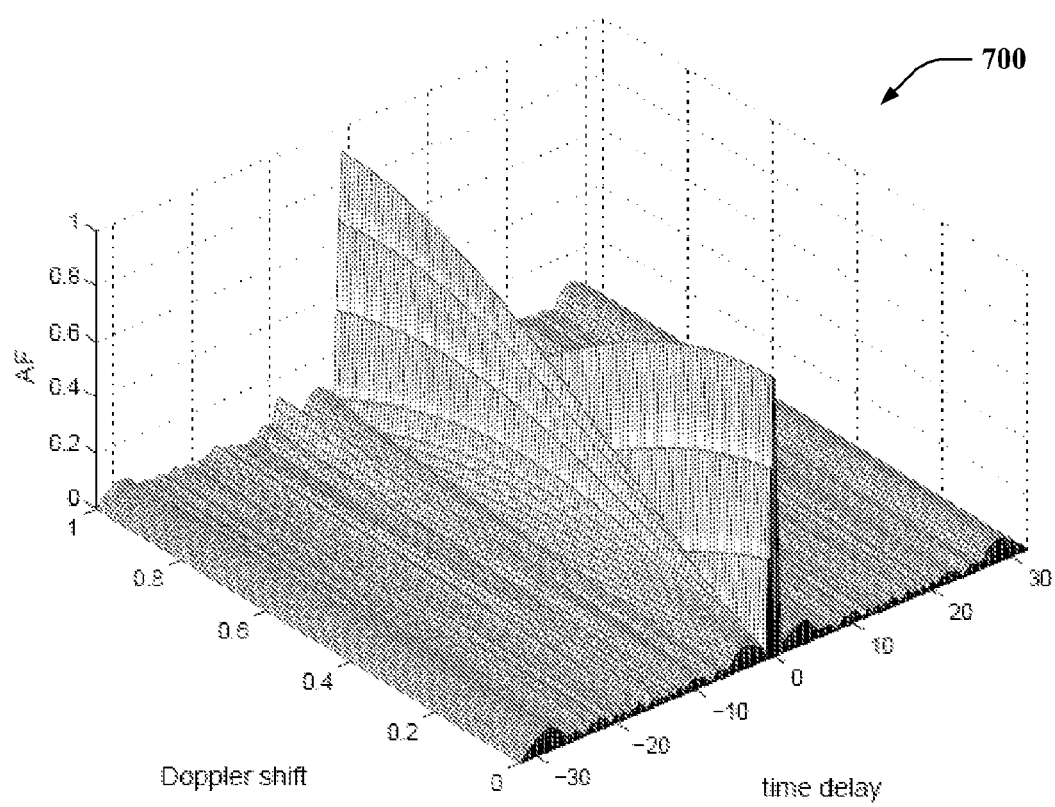
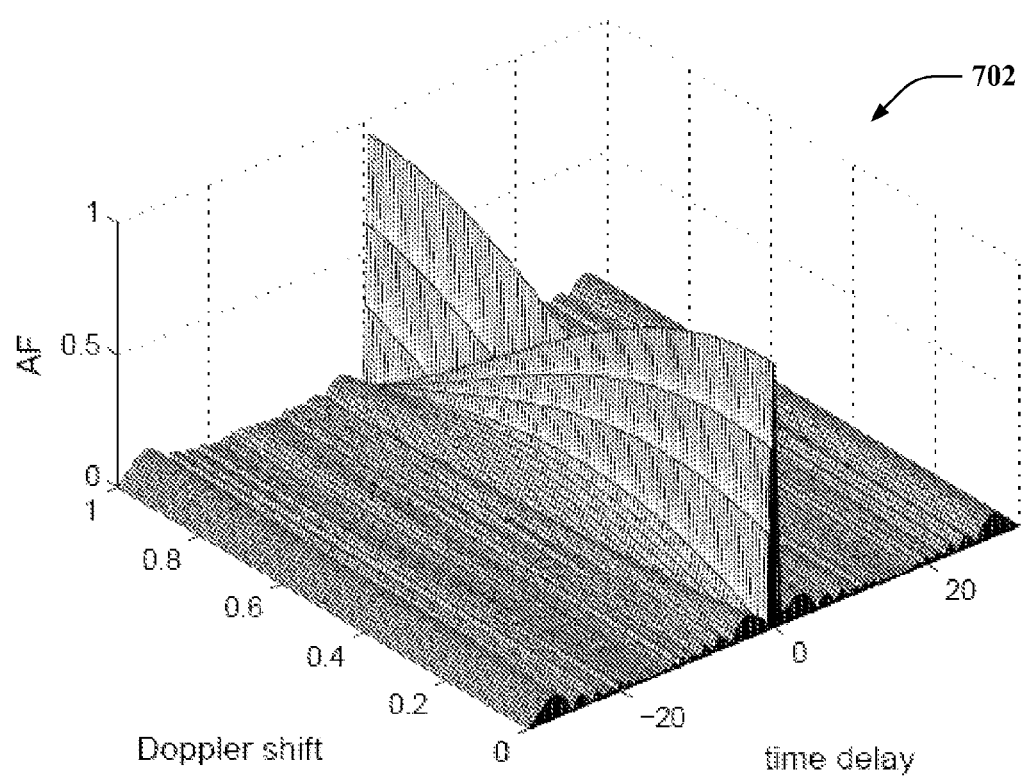
FIG. 7

POLYPHASE SEQUENCES FOR WIRELESS COMMUNICATIONS

RELATED APPLICATION

This patent application is a continuation application of U.S. patent application Ser. No. 12/183,005, filed Jul. 30, 2008, and entitled "POLYPHASE SEQUENCES FOR WIRELESS COMMUNICATIONS," the entirety of which patent application is incorporated herein by reference.

TECHNICAL FIELD

The present disclosure relates generally to wireless communications systems, and more particularly to polyphase sequences used to transmit signals in wireless communications.

BACKGROUND

Due to the broadcast nature of wireless communications systems, such as spread spectrum communications, radar, mobile device communications, etc., communicating devices need to differentiate between and/or synchronize with signals being transmitted by other devices in a given proximity. In addition, where the transmitting device is also receiving its signal, it needs to differentiate that signal from other signals. This can be accomplished by applying polyphase sequences to transmit signals, applying the sequences as communications preambles or headers for timing synchronization and channel estimation, and/or the like. Some polyphase sequences, more specifically constant amplitude zero autocorrelation (CAZAC) sequences, have evolved including Frank sequences, which are constrained to square numbered lengths, and Chu sequences, which are constrained to prime numbered lengths, when pairwise cross correlation properties need to be optimal.

Designed polyphase sequences can be application specific, for example. For radar, a utilized polyphase sequence exhibiting low sidelobe energy can be desired. Merit factors and/or peak-to-side-peak ratios can be utilized to measure total sidelobe energy and/or peak sidelobe energy. Chu and Frank sequences have tolerable merit factors and peak-to-side-peak ratios, and thus are used in implementations currently; however, Frank sequences are severely limited in available lengths, and Chu sequences require larger alphabet sizes to achieve desirable sidelobe energy. In addition, improved implementations seek to raise Frank sequence merit factors to more desirable levels, but do so at the cost of further increasing alphabet size. However, increased alphabet sizes typically lead to increased system implementation cost.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Polyphase sequences are provided for utilization in wireless communications systems (e.g., spectrum spread communications, radar applications, system identification, channel estimation, etc.). In particular, polyphase sequences of length $2m^2$, where m is an integer in the set of natural numbers, are presented having improved merit factors and peak-to-side-peak ratios than Chu sequences at sequence lengths unavailable with Frank sequences. This can result in lowered sidelobe energy. The sequences, in one example, can be perfect sequences with zero periodic autocorrelation functions for out-of-phase offsets as described herein. Moreover, the sequences can have an alphabet size smaller than the Chu sequences (a square root smaller in some cases), which can decrease implementation costs required to use the sequences. According to an example, the sequences are constructed by performing an exhaustive search over perfect root of unity sequences (PRUS) of a specified length, measuring the merit factors and peak-to-side-peak ratios of sequences to determine those having optimal results, and determining a common construction among the sequences.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed. The claimed subject matter is intended to include all such aspects and their equivalents. Other advantages and novel features of the claimed subject matter can become apparent from the following detailed description when considered in conjunction with the drawings.

BRIEF DESCRIPTION OF THE DRAWINGS

FIG. 7 illustrates exemplary graphs of ambiguity factors for the optimal polyphase sequences described herein and Chu sequences.

DETAILED DESCRIPTION

Figure 1:
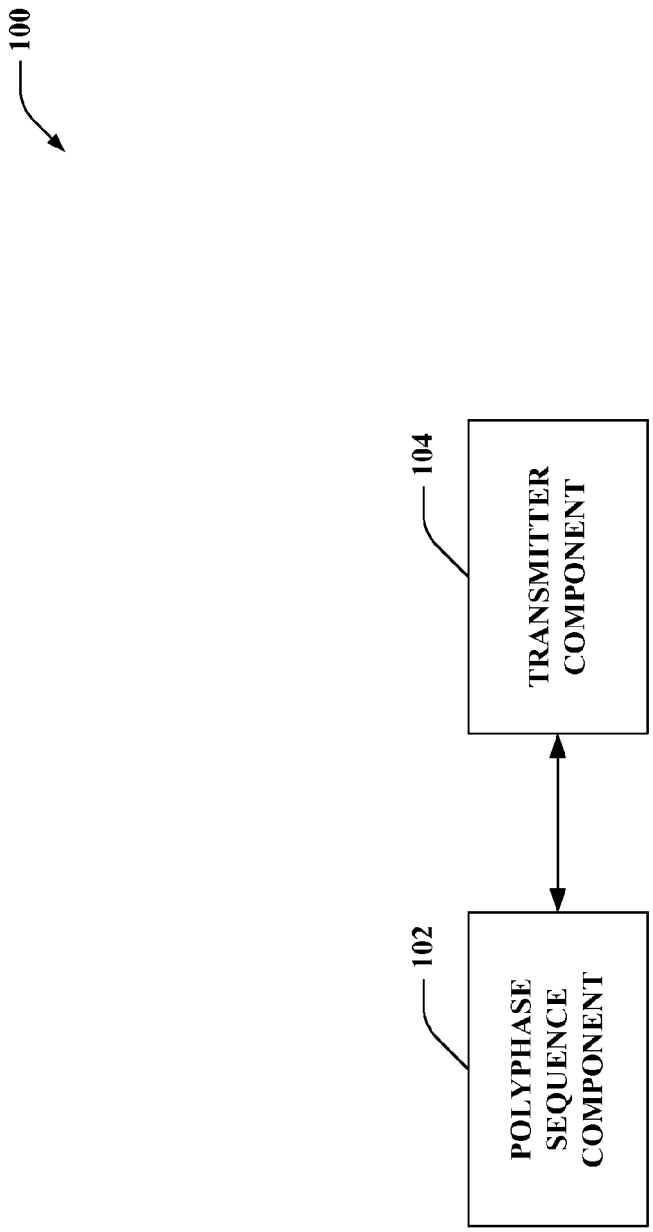
FIG. 1 illustrates a high-level block diagram of an example system that can transmit signals associated with polyphase sequences.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, the methods and apparatus of the claimed subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the claimed subject matter. The components may communicate via local and/or remote processes such as in accordance with a signal having one or more data packets (e.g., data from one component interacting with another component in a local system, distributed system, and/or across a network such as the Internet with other systems via the signal).

Additionally, while the present disclosure generally relates to single carrier communications systems, such as radar, and multiple carrier communications systems, such as Orthogonal Frequency Division Multiplexing (OFDM), those skilled in the art will recognize that the claimed subject matter can be used and applied in any wired or wireless communication system that utilizes polyphase sequences to transmit and interpret data between devices. It is to be appreciated that the systems and/or methods described herein can be employed in any suitable wireless communication system and that all such systems are intended to fall within the scope of the hereto appended claims.

Moreover, complex polyphase sequences refer to numeric sequences with length L and denoted $\{s(n)\}$ where $0 \leq n \leq L-1$. For $n \geq L$, $s(n)=s(n \mod L)$. Periodic cross-correlation function of two sequences $\{s_1(n)\}$ and $\{s_2(n)\}$, $\theta_x(\tau)$, $0 \leq \tau \leq L-1$ can be defined as $$\theta_x(\tau) = \sum_{n=0}^{L-1} s_1(n) s_2^*(n+\tau)$$

where $(\bullet)^*$ denotes the complex conjugate operator. The periodic autocorrelation of a sequence $\{s(n)\}$ can be the correlation itself given as $$\theta_{ss}(\tau) = \sum_{n=0}^{L-1} s(n) s^*(n+\tau).$$

In addition, perfectness, or a perfect sequence is intended to refer to a sequence whose out-of-phase periodic autocorrelation is zero (e.g., $\theta_{ss}(\tau)=0$, $\forall \tau \neq 0$). It is to be appreciated that an aperiodic autocorrelation function, $\phi_{ss}(\tau)$, can be computed similarly except that such a function need not be computed over the entire sequence of length L-1, but rather to L-1-$\tau$. A root of unity sequence can refer to a sequence whose elements $s(n)$, $m \in [0,N)$ are all complex roots of unity. In this regard, $s(n)$ is in the form of $\exp(i2\pi x)$, where x is a rational number. For example, $\exp(i2\pi/6)$ is root of unity while $\exp(i2\pi/\sqrt{2})$ is not. In addition, alphabet size can be defined as the minimum integer p such that $s^p(n)=1$, $\forall n \in [0, L)$. Thus, the alphabet size exists for root of unity sequences; for example, the alphabet size of a binary sequence is 2. Also, $\{\exp(i2\pi/6), \exp(i2\pi/3), \exp(i2\pi/4), \exp(i2\pi/5)\}$ has an alphabet size of 60. Further, a perfect root of unity sequence (PRUS) refers to a sequence that is perfect and root of unity, and constant amplitude zero autocorrelation (CAZAC) sequence refers to a perfect sequence whose amplitude is constant. Therefore, a PRUS is a CAZAC sequence, but a CAZAC sequence is not necessarily a PRUS.

Moreover, merit factors and peak-to-side-peak ratios can be computed from the aperiodic autocorrelation function $\phi_{ss}(\tau)$ described above. Thus, a merit factor F for substantially any perfect root-of-unity sequence, defined as the main sidelobe to total sidelobe energy ratio, can be computed as $$F = \frac{L^2}{2 \sum_{\tau=1}^{L-1} |\phi_{ss}(\tau)|^2}.$$

Further, the peak-to-side-peak ratio R of a PRUS, another important desirable property, can be measured using the following equation $$R = \frac{L}{\max_{1 \leq \tau \leq L-1} |\phi_{ss}(\tau)|}.$$

Additionally, Chu sequences are described herein and can refer to sequences of length L constructed by the following equation $$s_{Chu}(n) = \begin{cases} \exp\left(i\pi \frac{n^2 M}{L}\right) & \text{if } L \text{ is even} \\ \exp\left(i\pi \frac{n(n+1)M}{L}\right) & \text{if } L \text{ is odd} \end{cases}$$

where M is an integer co-prime to L and can also be called the decimation factor. Furthermore, Frank sequences are discussed and can be constructed as follows $$s_{Frank}(n) = \exp(i2\pi pq/\sqrt{L})$$

with $p = \lfloor n/\sqrt{L} \rfloor$ and $q = n \bmod \sqrt{L}$ where $\lfloor \bullet \rfloor$ is the floor operation. In this regard, for Chu sequences, length L can be substantially any natural number where Frank sequences are limited to square numbers. Pairwise correlated sequence sets can be constructed for the Frank and Chu sequences as well. For a sequence set with set size K, there are K sequences in the set and the worst case pairwise cross correlation can be $$Y = \max_{1 \leq i \leq j \leq K} \left\{ \max_{0 \leq \tau < L} \left\| \sum_{n=0}^{L-1} s_i(n) s_j^*(n+\tau) \right\| \right\}.$$

The minimum achievable cross correlation for sequences of length L can be $\sqrt{L}$. Thus, an optimal set of decimated Frank sequences of length $L = m^2$ can have a set size of $m-1$ for prime m. In addition, Chu sequences sets with prime length L and set size L−1 can be constructed as $$s_u(n) = \exp\left\{ i2\pi u \frac{n(n+1)}{2L} \right\}$$

where u is a sequence index that can be substantially any integer $\epsilon \{1, L\}$. It is to be appreciated that the sequence length is further limited to a prime number and the square of prime number for Chu and Frank sequence sets respectively.

As described previously, polyphase sequences can be utilized in time synchronization for wireless communications systems, channel estimation, cell identification, and/or the like. For example, time synchronization can be achieved by correlating a received sequence $\{r(n)\}$ with the reference sequence $\{s(n)\}$. As the sequence $\{s(n)\}$ is perfect without noise, the offset $\tau$ that results in a peak is the starting boundary of a symbol. $\{r(n)\}$ can be obtained from the received stream with a sliding window of size L.

$$b = \arg \left\{ \max_{0 \leq \tau < L} \left\| \sum_{n=0}^{L-1} r(n) s^*(n+\tau) \right\| \right\}$$

In this operation, for example, the perfectness property, as described previously, is used. In an OFDM system, channel coefficients for estimation can be obtained, for example, by dividing the received sequence elements by the reference sequence elements in the frequency domain, for example.

$$h(n) = r(n)/s(n), n = 0, 1, \ldots, L-1$$

In addition, for cell identification where each cell can be assigned a sequence, cells can be identified by determining a sequence index u assigned to the cell. This can be determined by correlation as shown in the following equation.

$$u = \arg \left\{ \max_{1 \leq i \leq K} \left\{ \max_{0 \leq \tau < L} \left\| \sum_{n=0}^{L-1} r(n) s_i^*(n+\tau) \right\| \right\} \right\}$$

where $\{r(n)\}$ is the received sequence. As shown, the correlation can be computed between the received sequence and each sequence in the set; also, the sequence index that results in maximum correlation can be determined in this regard. In this example, this can be by utilizing the low pairwise cross correlation property of the sequence set.

Unified construction of PRUS can be presented as well. A PRUS of length $L = sm^2$ can be constructed as $$s(n) = \exp\left( i2\pi \frac{mc(s)\alpha(l)k^2 + \beta(l)k + f_l(0)}{sm} \right)$$

where $$c(s) = \left\{ \begin{array}{ll} 1/2 & \text{if } s \text{ is even} \\ 1 & \text{otherwise} \end{array} \right\},$$

$n \epsilon Z_{sm^2}$, $l = n \bmod m$, $k = \lfloor n/m \rfloor$, $\alpha(l) \epsilon Z_s$ is a function with gcd $(\alpha(l), s) = 1$, $\forall l \epsilon Z_m$, $\beta(l) \epsilon Z_{sm}$ is a function such that $\beta(l) \pmod m$ is a permutation of the elements of $Z_m$, and $f_l(0)$, $\forall l \epsilon Z_m$ are rational numbers. In this example, $Z_m$ denotes non-negative integers less than m, and i is the imaginary unit. Additionally, to this end, a minimum alphabet size $A_{mm}$ for the foregoing can be computed as $$A_{min} = \left\{ \begin{array}{ll} 2sm & \text{if } s \text{ is even and } m \text{ is odd} \\ sm & \text{otherwise} \end{array} \right\}.$$

Referring to FIG. 1, a high-level block diagram of a wireless communication system 100 in accordance with various aspects presented herein is illustrated. In one example, the system 100 includes a polyphase sequence component 102 that can generate and apply one or more polyphase sequences to utilize in communicating with one or more devices and a transmitter component 104 that transmits polyphase sequence applied data. In one example, the polyphase sequence component 102 can receive data to transmit. The polyphase sequence component 102 can apply or associate a polyphase sequence with the data, and utilize the transmitter component 104 to transmit the data to one or more devices. The polyphase sequence can be determined by a receiver and used to differentiate the transmission from that of other devices, estimate communication channels, synchronize communications between devices, and/or the like. It is to be appreciated that the components shown can be implemented in substantially any single or multiple carrier communication system, including but not limited to spread spectrum systems, radar, multiple access wireless systems (e.g., OFDM configurations), and/or the like.

According to an example, the polyphase sequences utilized by the polyphase sequence component 102 can have good aperiodic correlation properties, such as good merit factors and desirable peak-to-side-peak ratios. The sequence can be perfect with zero periodic autocorrelation functions for out-of-phase offsets. These properties can relate to total sidelobe energy and peak sidelobe energy for single carrier communications, such as radar. The polyphase sequences can be applied to communications by the polyphase sequence component 102 and transmitted by the transmitter component 104 with low sidelobe energy levels for radar, system identification, etc. According to one example, the polyphase sequences generated for use in the polyphase sequence component 102 can be of length $2m^2$, $m \epsilon N$, the set of natural numbers, and can perform better than Chu sequences while providing length sizes unattainable by Frank sequences. Moreover, the sequences utilized by the polyphase sequence component 102 can have decreased alphabet sizes when compared to the Chu sequences. This can result in easier implementation of systems utilizing the polyphase sequence component 102. In one example, correlating sequences using digit-by-digit type methods, such as coordinate rotation digital computer (CORDIC), can result in complexity that can be linearly proportional to a phase alphabet size. Thus, reducing the alphabet size results in lower complexity, and therefore decreased system implementation cost.

Figure 2:
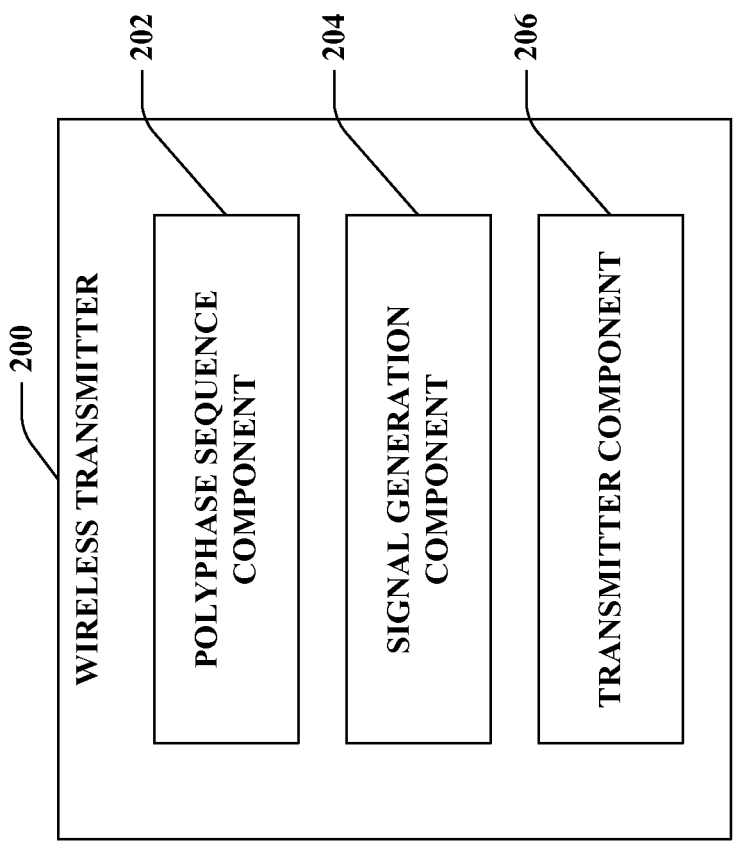
FIG. 2 illustrates a block diagram of an example wireless transmitter in accordance with various aspects.

Turning to FIG. 2, a block diagram of an example wireless transmitter 200 in accordance with various aspects is illustrated. The wireless transmitter 200 can be employed in a variety of environments including radar, system identification, spread spectrum communications, etc. In one example, the wireless transmitter 200 can include a polyphase sequence component 202 that can generate one or more polyphase sequences exhibiting desirable properties, as described, such as good merit factors and peak-to-side-peak ratios for decreased sidelobe energy. In addition, the wireless transmitter 200 can include a signal generation component 204 that can create signals for transmission where the signals are constructed from a sequence generated by the polyphase sequence component 202. In one example, the signal can be created from parameters specified by the signal generation component 204 and/or another component of the wireless transmitter 200. Moreover, a transmitter component 206 can be provided to transmit the signals to one or more devices or objects (e.g., for receipt thereof by the device or to rebound from the device/object in a radar system).

According to an example, the polyphase sequence component 202 can generate a polyphase sequence exhibiting the aforementioned desirable aperiodic correlation properties. For example, the polyphase sequences can be of lengths $L=sm^2$ where s and m are non-negative integers and constructed as PRUS shown above where $$\alpha(l) = 1;$$
$$\beta(l) = \left\lfloor \frac{3m-1}{2} \right\rfloor - l;$$
$$f_l(0) = 0;$$

and $l \in Z_m$. In addition, in this example, s can be 2. Thus, the polyphase sequence component 202 can construct sequences according to the following equation, $$s(n) = \exp\left(i2\pi \frac{m/2k^2 + \beta(l)k}{2m}\right)$$

with $$k = \lfloor n/m \rfloor$$

and $$\beta(l) = \left\lfloor \frac{3m-1}{2} \right\rfloor - (n \bmod m)$$

which produces sequences having improved merit factors and peak-to-side-peak ratios over Chu sequences at lengths unavailable using Frank sequences as shown infra. In addition, the alphabet size required for the above sequences are a fraction of that required for Chu sequences to achieve substantially similar performance. In addition, where L is an even number of the value $2m^2$, the alphabet size $A_{Chu}=2L$. However, the sequences proposed, where of length L, result in an alphabet size of $$A = \begin{cases} \sqrt{8L} & \text{if } \sqrt{L/2} \text{ is odd} \\ \sqrt{2L} & \text{if } \sqrt{L/2} \text{ is even} \end{cases},$$

a reduction factor of $\sqrt{2L}$ from that of Chu sequences. This can lead to easier or lower cost implementation of a polyphase sequence component 202 for generating the sequences as shown above. In addition, such a low alphabet size requirement allows for extending the utilized alphabet size to further improve merit factors. In one example, the signal generation component 204 and/or another component of the wireless transmitter 200 can specify a desired length L for the sequence, from which m and/or an alphabet size A can be computed. Additionally or alternatively, the alphabet size can be specified from which the requisite length can be calculated using the above formulas.

The signal generation component 204 can receive a polyphase sequence from the polyphase sequence component 202 to utilize in transmitting data to one or more devices or broadcasting such for reflection from one or more objects. The polyphase sequence can be specific for the wireless transmitter 200 in a communications environment, specific to a receiver of the signal (or object reflecting the signal), specific to a message transmitted or information desired in return, and/or the like. Thus, the polyphase sequence can be differentiated for identification purposes of the transmitter and/or receiver (or reflector in a radar implementation). In addition, the polyphase sequence can be applied to data by the signal generation component 204. This can be a direct application affecting structure of the data, such as a scrambling, modulation, binary operation, choosing signals relating to data values, etc. with the sequence, or an indirect application, such as adding the sequence to a preamble (e.g., OFDM preamble) or other portion of the communication comprising parameters regarding the communication. Upon generating the signal, the transmitter component 206 can transmit the signal to one or more devices, or to be reflected from one or more devices as described.

Figure 3:
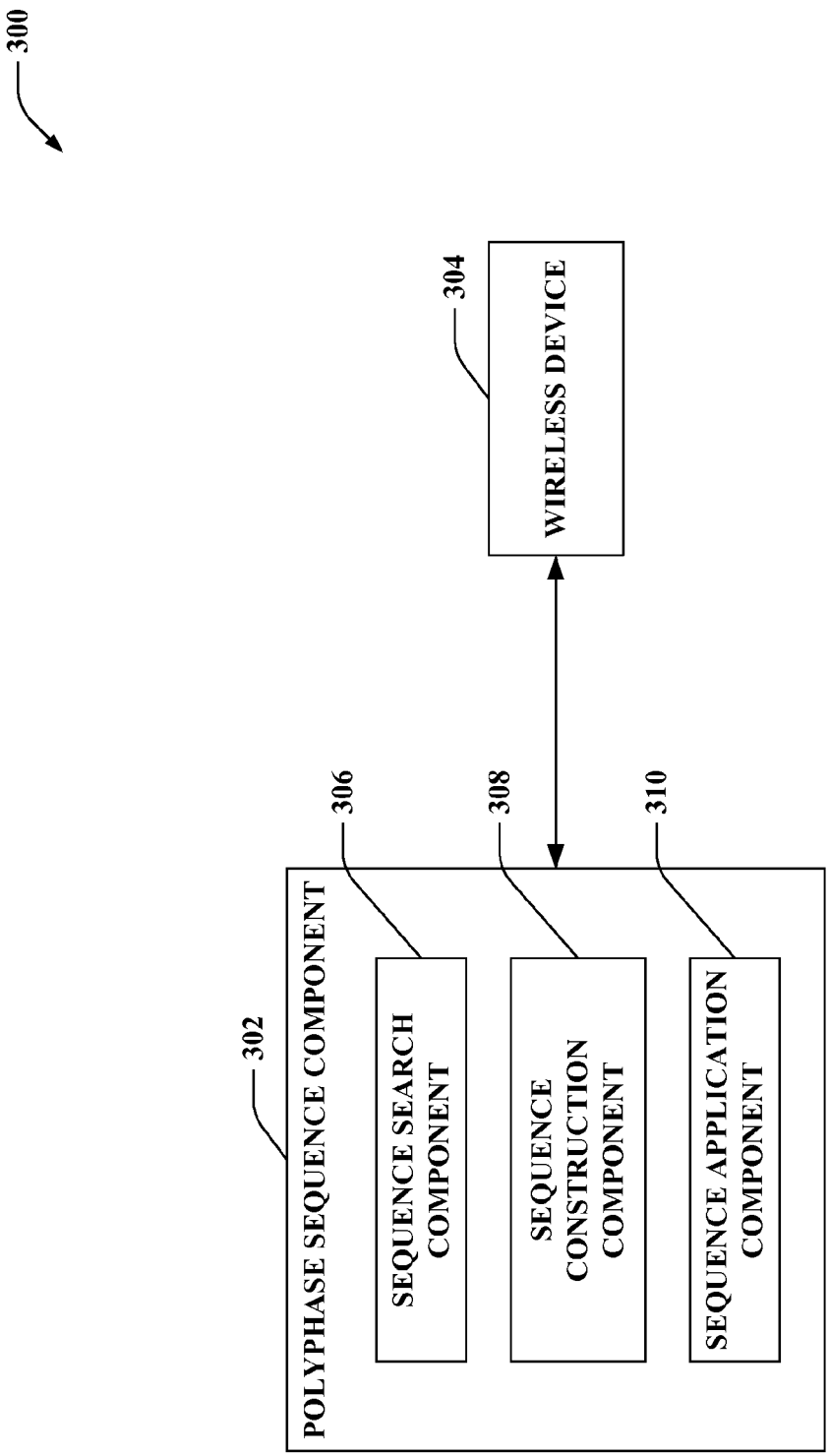
FIG. 3 illustrates a block diagram of an example system for utilizing polyphase sequences in wireless communications.

Turning to FIG. 3, a block diagram of an example system 300 that can construct polyphase sequences for use in wireless communications is shown. In particular, a polyphase sequence component 302 is provided that can generate polyphase sequences as described. The sequences can be utilized with a wireless device 304 in a wireless network, in one example. The polyphase sequence component 302 comprises a sequence search component 306 that can search a number of sequences to determine those having desirable properties and/or infer variables that can be utilized to construct such sequences for various lengths and alphabet sizes. The polyphase sequence component 302 can also comprise a sequence construction component 308 that can create sequences based at least in part on results from the sequence search component 306 and a sequence application component 312 that can apply one or more constructed sequences to desired data. The sequence applied data can be utilized in communicating with a wireless device 304, in one example.

According to an example, the sequence search component 306 can perform an exhaustive search for PRUS, defined above, having a maximum merit factor F for small sequence length L. In one example, the sequence search component 306 can perform some invariant operations to change sequence without significantly altering the absolute value of its autocorrelation function (ACF), which can significantly reduce the search space. For example, the sequence search component 306 can apply a linear phase shift to substantially every element of a sequence—this does not alter the absolute value of the ACF. Moreover, the sequence search component 306 can perform cyclic shifting as this does not substantially alter the ACF. In addition, the sequence search component 306 can evaluate a complex conjugate of a sequence as it has a substantially identical value for ACF. Additionally, the sequence search component 306 can consider sequences that are reflections of evaluated sequences as the reflections have substantially the same merit factors.

Moreover, for any perfect sequence, it can be shown $\phi_{ss}(\tau) = -\phi^*_{ss}(N-\tau)$ and $\phi_{ss}(\tau)=0$ if $\tau \pmod{sm}=0$.

$$\theta_{ss}(\tau) = \sum_{n=0}^{L-1} s(n)s^*(n+\tau)$$

$$= \phi_{ss}(\tau) + \sum_{n=L-\tau}^{L-1} s(n)s^*(n+\tau-L)$$

$$= \phi_{ss}(\tau) + \sum_{n=0}^{\tau-1} s(n+L-\tau)s^*(n)$$

$$= \phi_{ss}(\tau) + \left[\sum_{n=0}^{L-(L-\tau)-1} s^*(n+L-\tau)s(n)\right]^*$$

$$= \phi_{ss}(\tau) + \phi^*_{ss}(L-\tau)$$

$$= 0$$

Considering these additional properties, the sequence search component 306 can reduce the computational requirement for the search. The sequence search component 306 can initially construct PRUS as described supra and compute the merit factor to determine if it meets a threshold. It is to be appreciated that the peak-to-side-peak can be computed and compared to a threshold as well. Where m=1, the sequence search component 306 can determine that Chu sequences are optimal. For square length sequences (e.g., L=4, 9, 16, ... ), Frank sequences can be optimal in some cases. However, for example, where L=sm², s=2, and m>1, the sequences described herein are determined to have optimal merit factors and/or peak-to-side-peak ratios by the sequence search component 306. After applying invariant transforms to these other superior sequences, the sequence search component 306 can determine a consistent construction pattern for the sequences, as shown above.

For example, as described above, where s=2, the sequence search component 306 can determine PRUS where α(l)=1;

$$\beta(l) = \left\lfloor \frac{3m-1}{2} \right\rfloor - l;$$

$f_l(0)=0$; and $l \in Z_m$ have more desirable merit factors and/or peak-to-side-peak ratios than Chu, Frank, or substantially any known sequences. In addition, as described, the sequences can require smaller alphabet sizes than respective Chu and Frank sequences, which can result in streamlined implementation of devices utilizing the polyphase sequence component 302 as shown above. Moreover, the sequence construction component 308 can utilize the variables or parameters determined by the sequence search component 306 to create sequences for utilization in a communication environment. In one example, the sequence construction component 308 can determine and/or receive desired lengths or alphabet sizes for the sequences and construct the sequences according to these parameters. It is to be appreciated that these parameters can be utilized by the sequence search component 306 in the search as well. Once constructed, the sequence application component 310 can associate the sequences with wireless communications; in one example, the communications can relate to wireless device 304 and the sequences can be applied to data related thereto, whether modulated with the data, placed in a header, and/or the like as previously described.

Figure 4:
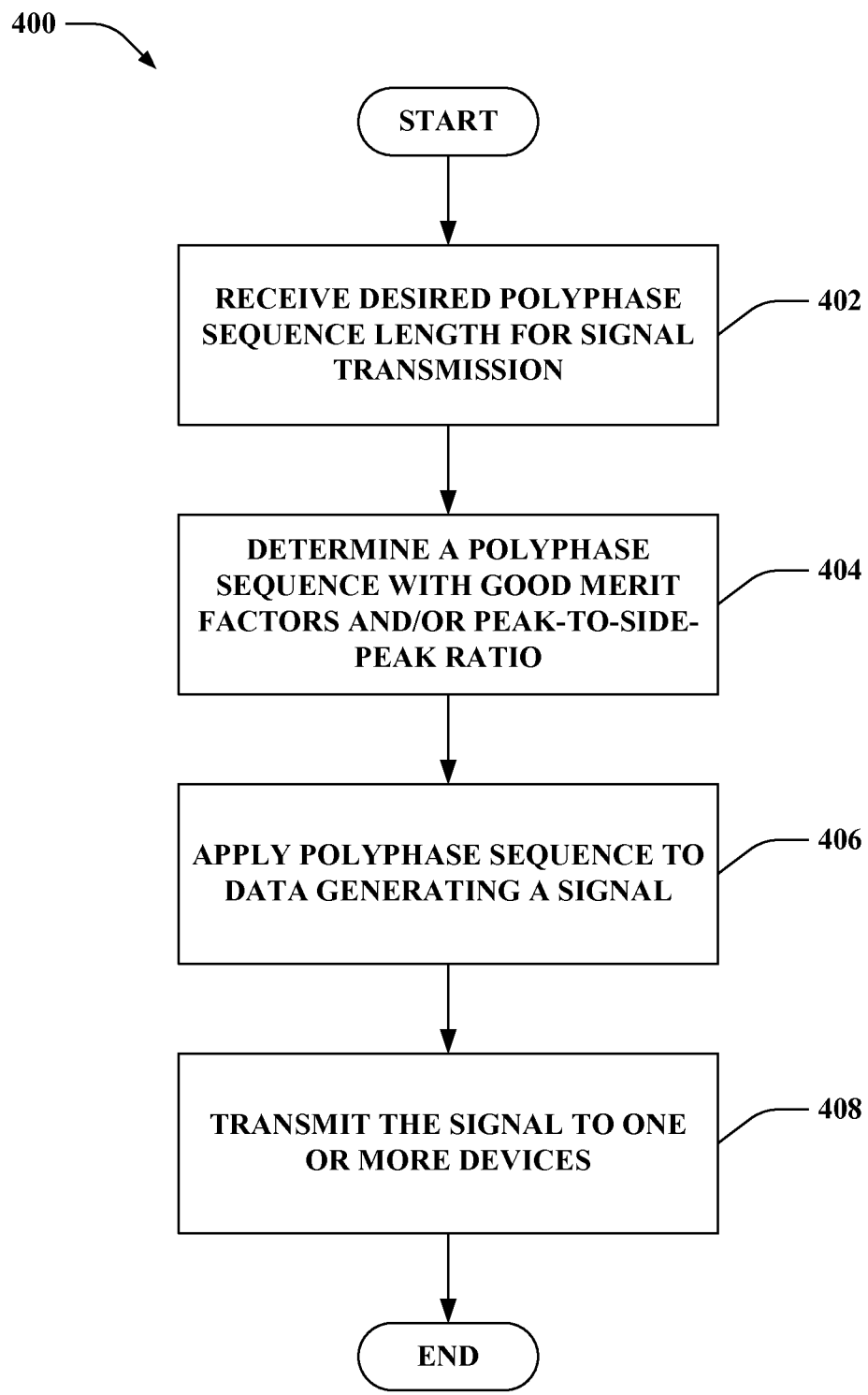
FIG. 4 illustrates an exemplary flow chart for applying polyphase sequences to one or more signals.
Figure 5:
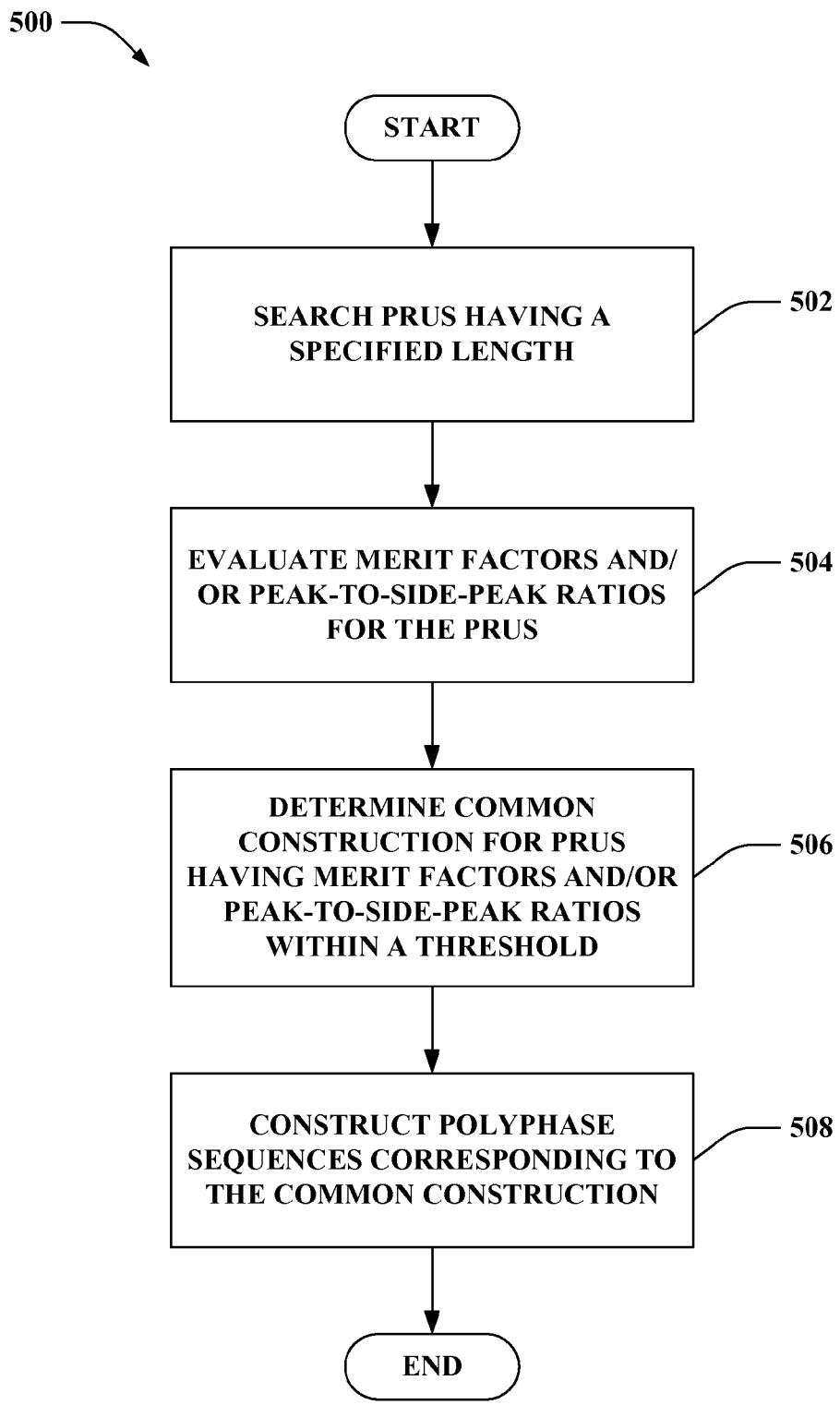
FIG. 5 illustrates an exemplary flow chart for searching and constructing polyphase sequences with desirable merit factors and/or peak-to-side-peak ratios.

Referring now to FIGS. 4-5, methodologies that can be implemented in accordance with various aspects described herein are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies in accordance with the claimed subject matter.

Furthermore, the claimed subject matter may be described in the general context of computer-executable instructions, such as program modules, executed by one or more components. Generally, program modules include routines, programs, objects, data structures, etc., that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Referring to FIG. 4, a methodology 400 that facilitates applying polyphase sequences having good merit factors and peak-to-side-peak ratios to one or more signals is displayed. At 402, a desired polyphase sequence length for signal transmission is received. This can be from a transmitting device, such as a radar, wireless radio, spread spectrum device, etc., desiring to utilize a polyphase sequence in transmitting data. The polyphase sequence can allow for system identification, channel estimation, and/or the like, as described, and/or provide signal transmission with low sidelobe energy. At 404, a polyphase sequence with good merit factors and/or peak-to-side-peak ratios can be determined as described above.

For example, the sequence can be determined according to one or more equations described above. In addition, the sequence can have a lower alphabet size than other sequences (such as Frank and/or Chu sequences). As shown, this can be beneficial in reducing implementation costs, for example where CORDIC or other sequence correlation methods that increase in complexity as the required alphabet size grows are utilized. At 406, the polyphase sequence can be applied to data to generate a signal. As described, this can include modulating the data with the sequence, choosing sequences representative of different values, applying the sequence in a communication preamble or header, and/or the like. At 408, the signal can be transmitted to one or more devices. As mentioned, the devices can receive the signal or rebound the signal (such as in a radar configuration). The signal can have low sidelobe energy related to the merit factor and/or peak-to-side-peak ratio.

Turning now to FIG. 5, a methodology 500 that facilitates searching for one or more sequences with good merit factors and/or peak-to-side-peak ratios is shown. At 502, PRUS having certain lengths can be searched. It is to be appreciated that as the length increases, the number of PRUS exhaustively searched can increase exponentially. However, utilizing the principles above can lessen the search burden (e.g., applying a linear phase shift, cyclic shifting, evaluating complex conjugates, etc.). At 504, merit factors and/or peak-to-side-peak ratios for the PRUS can be evaluated. In the search, the PRUS having optimal merit factors and/or peak-to-side-peal ratios can be noted. During or following the search, at 506, a common construction for PRUS having merit factors and/or peak-to-side-peak ratios within a threshold can be determined For example, as described, using the PRUS formula to search, this can include PRUS where $\alpha(l)=1$;

$$\beta(l) = \left\lfloor \frac{3m-1}{2} \right\rfloor - l;$$

$f_l(0)=0$; and $l \in Z_m$. Thus, at 508, polyphase sequences can be constructed according to this common construction and subsequently utilized in wireless communications.

Figure 6:
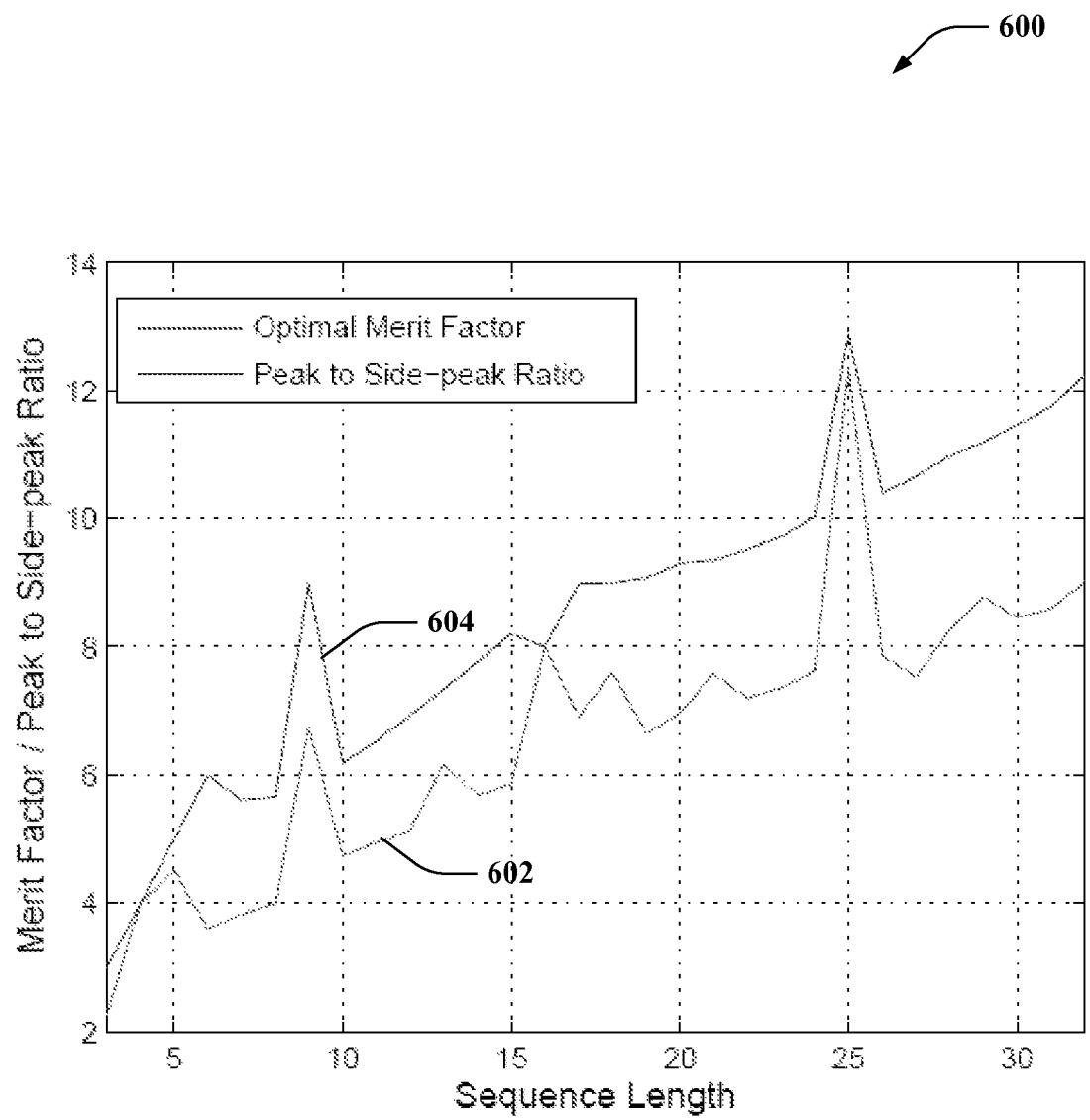
FIG. 6 illustrates an exemplary graph related to merit factors and peak-to-side-peak ratios of the optimal polyphase sequences described herein.

Referring now to FIG. 6, illustrated is an example graph 600 representing measured merit factors and peak-to-side-peak ratios of the described sequences resulting from an exhaustive search over the sequences as discussed supra. The merit factors represented by line 602 relate to those calculated as shown above for given sequence lengths. The peak-to-side-peak ratios, represented by line 604, are recorded as well for each sequence length. For the sequences presented herein, the graph 600 shows that merit factors and peak-to-side-peak ratios generally increase as the sequence length increases; moreover, square sequence lengths (e.g., sequence lengths whose square roots result in a positive integer) generally produce more desirable merit factors and peak-to-side-peak ratios than adjacent lengths. Below is a corresponding table of search results where sequences obtained by invariant transforms, which are considered duplicate as described, are represented only by one sequence (the sequence with minimum $f_l(0)$, but where the $f_l(0)$ for each are equal, the sequence with minimum $\beta(l)$).

| N | $A_{min}$ | s | Merit F | Peak Sidelobe | $\alpha$ | $\beta$ | $f_l(0)$ |
|---|---|---|---|---|---|---|---|
| 3 | 3 | 3 | 2.250 | 1.000 | [1] | [0] | [0] |
| 4 | 2 | 1 | 4.000 | 1.000 | [0 0] | [0 1] | [0 0] |
| 5 | 5 | 5 | 4.523 | 1.000 | [2] | [0] | [0] |
| 6 | 12 | 6 | 3.600 | 1.000 | [1] | [0] | [0] |
| 7 | 7 | 7 | 3.830 | 1.247 | [3] | [0] | [0] |
| 8 | 4 | 2 | 4.000 | 1.414 | [1 1] | [0 1] | [0 0] |
| 9 | 3 | 1 | 6.750 | 1.000 | [0 0 0] | [0 1 2] | [0 0 0] |
| 9 | 3 | 1 | 6.750 | 1.000 | [0 0 0] | [1 0 2] | [0 0 1] |
| 10 | 20 | 10 | 4.749 | 1.618 | [1] | [0] | [0] |
| 11 | 11 | 11 | 4.951 | 1.683 | [5] | [0] | [0] |
| 12 | 6 | 3 | 5.143 | 2.000 | [1 1] | [3 0] | [0 0] |
| 12 | 6 | 3 | 5.143 | 1.732 | [2 2] | [2 3] | [0 0] |
| 12 | 6 | 3 | 5.143 | 1.732 | [2 1] | [1 4] | [0 0] |
| 13 | 13 | 13 | 6.179 | 1.771 | [6] | [0] | [0] |
| 14 | 28 | 14 | 5.683 | 1.802 | [1] | [0] | [0] |
| 15 | 15 | 15 | 5.864 | 1.827 | [7] | [0] | [0] |
| 16 | 4 | 1 | 8.000 | 1.414 | [0 0 0 0] | [0 1 2 3] | [0 0 0 0] |
| 16 | 4 | 1 | 8.000 | 2.000 | [0 0 0 0] | [1 0 3 2] | [0 0 0 1] |
| 17 | 17 | 17 | 6.915 | 1.891 | [8] | [0] | [0] |
| 18 | 12 | 2 | 7.610 | 2.000 | [1 1 1] | [5 0 1] | [0 0 0] |
| 19 | 19 | 19 | 6.653 | 2.094 | [9] | [0] | [0] |
| 20 | 10 | 5 | 6.970 | 2.149 | [3 3] | [4 5] | [0 0] |
| 21 | 21 | 21 | 7.586 | 2.247 | [10] | [0] | [0] |
| 22 | 44 | 22 | 7.205 | 2.310 | [1] | [0] | [0] |
| 23 | 23 | 23 | 7.357 | 2.365 | [11] | [0] | [0] |
| 24 | 12 | 6 | 7.629 | 2.394 | [1 1] | [0 1] | [0 0] |
| 25 | 5 | 1 | 12.362 | 1.940 | [0 0 0 0 0] | [1 0 3 4 2] | [0 0 0 0 1] |
| 26 | 52 | 26 | 7.858 | 2.497 | [1] | [0] | [0] |
| 27 | 9 | 3 | 7.527 | 2.532 | [2 2 2] | [3 4 5] | [0 0 0] |
| 28 | 14 | 7 | 8.270 | 2.548 | [4 4] | [6 7] | [0 0] |
| 29 | 29 | 29 | 8.782 | 2.592 | [14] | [0] | [0] |
| 30 | 60 | 30 | 8.462 | 2.618 | [1] | [0] | [0] |
| 31 | 31 | 31 | 8.595 | 2.642 | [15] | [0] | [0] |
| 32 | 8 | 2 | 9.013 | 2.613 | [1 1 1 1] | [1 0 7 6] | [0 1 2 3] |

From the table, a construction pattern for sequences of length $2m^2$ is not obvious. However, after applying invariant transforms, as described above, the following consistent construction pattern can be obtained.

$$\begin{cases} \alpha = [1\ 1], \beta = [2\ 1], f_l(0) = [0\ 0]; & m=2, F=4.000 \\ \alpha = [1\ 1\ 1], \beta = [4\ 3\ 2], f_l(0) = [0\ 0\ 0]; & m=3, F=7.610 \\ \alpha = [1\ 1\ 1\ 1], \beta = [5\ 4\ 3\ 2], f_l(0) = [0\ 0\ 0\ 0]; & m=4, F=9.013 \end{cases}$$

Moreover, the above sequences in the search results, with s=3 and m=2, 3, 4, not only have optimal merit factors F, but also result in the smallest peak sidelobe (which can be related to the largest peak-to-side-peak ratio). From these results, it can be determined that PRUS where $\alpha(l)=1$;

$$\beta(l) = \left\lfloor \frac{3m-1}{2} \right\rfloor - l;$$

$f_l(0)=0$; and $l \in Z_m$ provide optimal results for sequences of length $L=2m^2$.

Turning now to FIGS. 7-11, various graphs are depicted comparing search results relating to the optimal sequences described herein to Chu sequences. As will be appreciated when referring to the graphs, the sequences described herein produce more optimal results than Chu sequences with respect to peak-to-side-peak ratios and merit factors at a fraction of the required alphabet size. Referring to FIG. 7, example graphs 700 and 702 are shown representing ambiguity functions for the sequences described herein and Chu sequences, respectively, for length L=32. The ambiguity function relates to time response of a filter matched to a given finite energy signal where the signal is received with a delay and a Doppler shift. As represented by the graphs, the ambiguity functions for signals utilizing the sequences described herein when compared to corresponding Chu sequences are quite similar. Thus, there is substantially no added distortion when utilizing the sequences presented herein over the Chu sequences.

Figure 8:
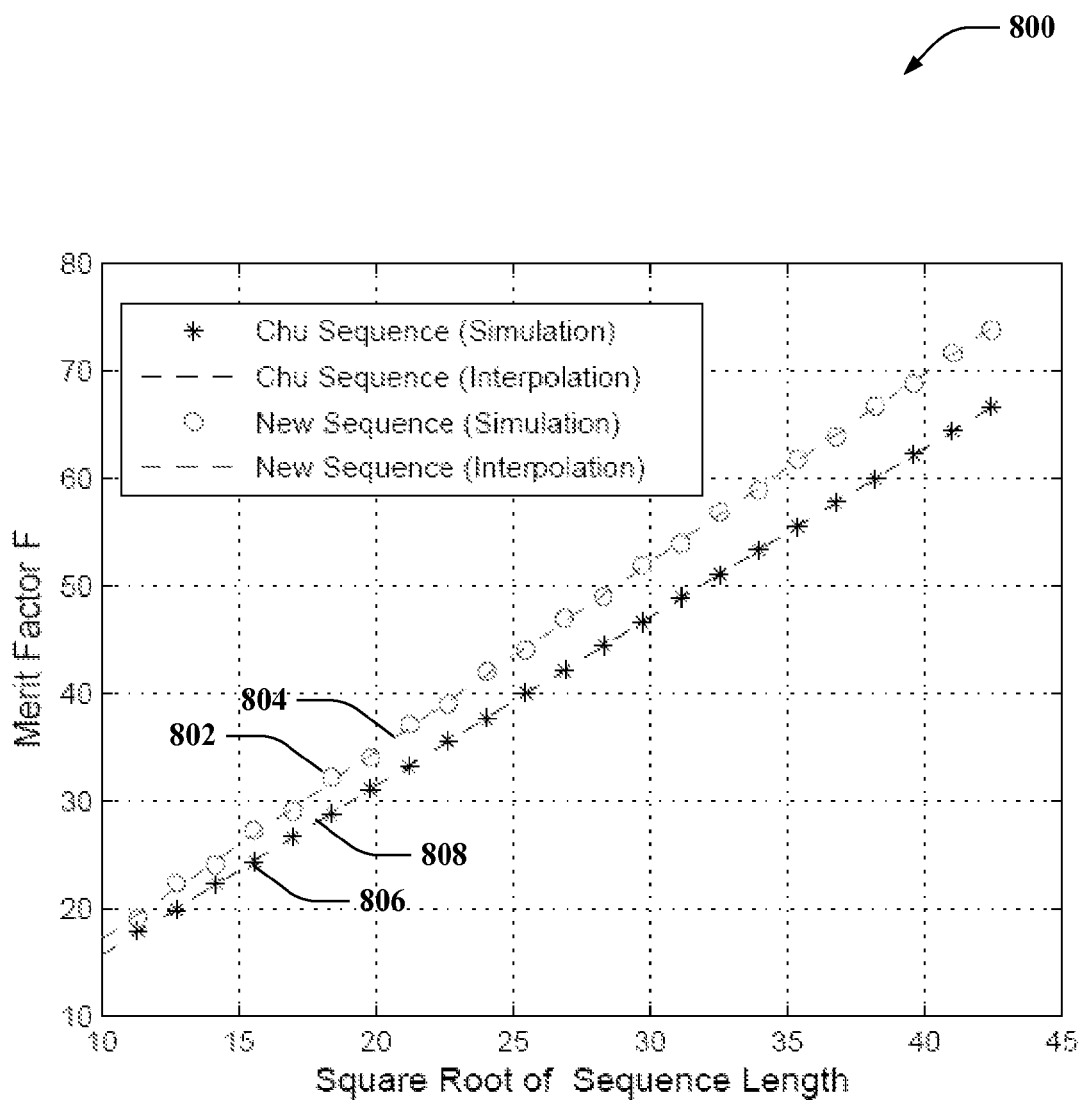
FIG. 8 illustrates an exemplary graph comparing merit factors of the optimal polyphase sequences presented herein and Chu sequences.
Figure 9:
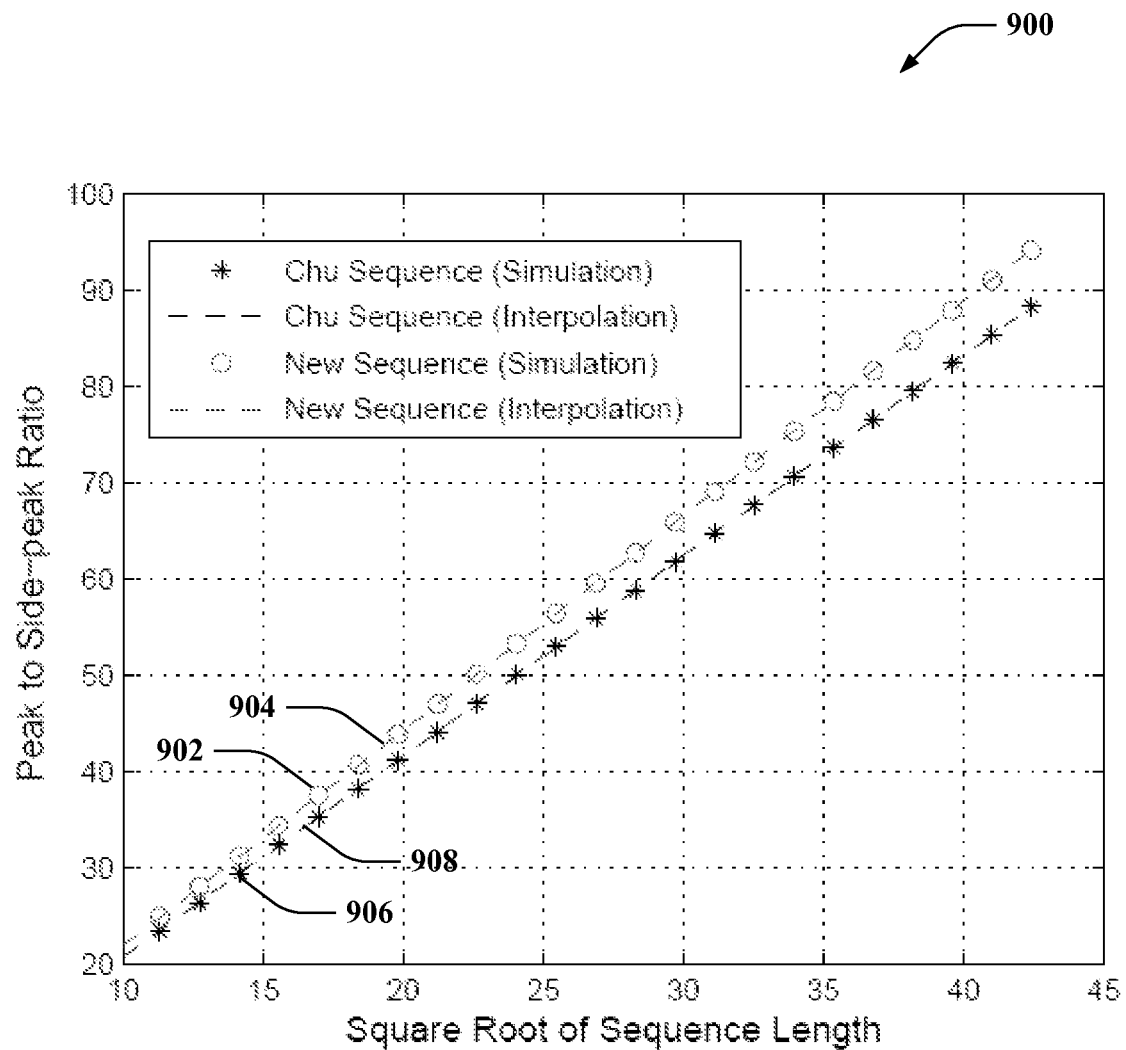
FIG. 9 illustrates an exemplary graph comparing peak-to-side-peak ratios of the optimal polyphase sequences described herein and Chu sequences.

Now referring to FIGS. 8-9, example graphs 800 and 900 respectively showing merit factors and peak-to-side-peak ratios of the sequences presented herein (referred to as "new sequences") as compared to those of conventional Chu sequences over square root of sequence length L are displayed. The circles 802 and 902 relate to merit factors and peak-to-side-peak ratios, respectively, for the new sequences measured in simulation, and the lines 804 and 904 respectively relate to new sequence merit factors and peak-to-side-peak ratios as measured by interpolation for length $2m^2$. Similarly, the asterisks 806 and 906 respectively represent merit factors and peak-to-side-peak ratios of conventional Chu sequences measured in simulation over the square root of sequence length while the lines 808 and 908 represent the merit factors and peak-to-side-peak ratios, respectively, of Chu sequences measured through interpolation. It is evident, from the graphs 800 and 900, that the merit factors F and peak-to-side-peak ratios R of the sequences increase substantially linearly with $\sqrt{L}$.

In this regard, the merit factors and peak-to-side-peak ratios can be expressed as first order polynomials of $\sqrt{L}$.

$$F = a_F \sqrt{L} + b_F$$

$$R = a_R \sqrt{L} + b_R$$

Values for $a_F, b_F, a_R$, and $b_R$ can be obtained such that the first order polynomials above can fit the available points by simulation, in the least square sense. The computed values can be $$(a_F, b_F) = \begin{cases} (1.5674, 0.1185) & \text{Chu sequence} \\ (1.7520, -0.3396) & \text{New sequence} \end{cases}$$

$$(a_R, b_R) = \begin{cases} (2.0822, -0.0093) & \text{Chu sequence} \\ (2.2298, -0.3217) & \text{New sequence} \end{cases}$$

The interpolation factors for the new sequences 804 and 904 and for the Chu sequences 808 and 908 are plotted based on computation using the above coefficients in the given first order polynomials. It is shown that the sequences presented herein have coefficients approximately 0.2 greater than Chu sequences, and thus have more optimal merit factors F and peak-to-side-peak ratios R; the degree of optimality improves for the sequences presented herein as the sequence length increases.

Figure 10:
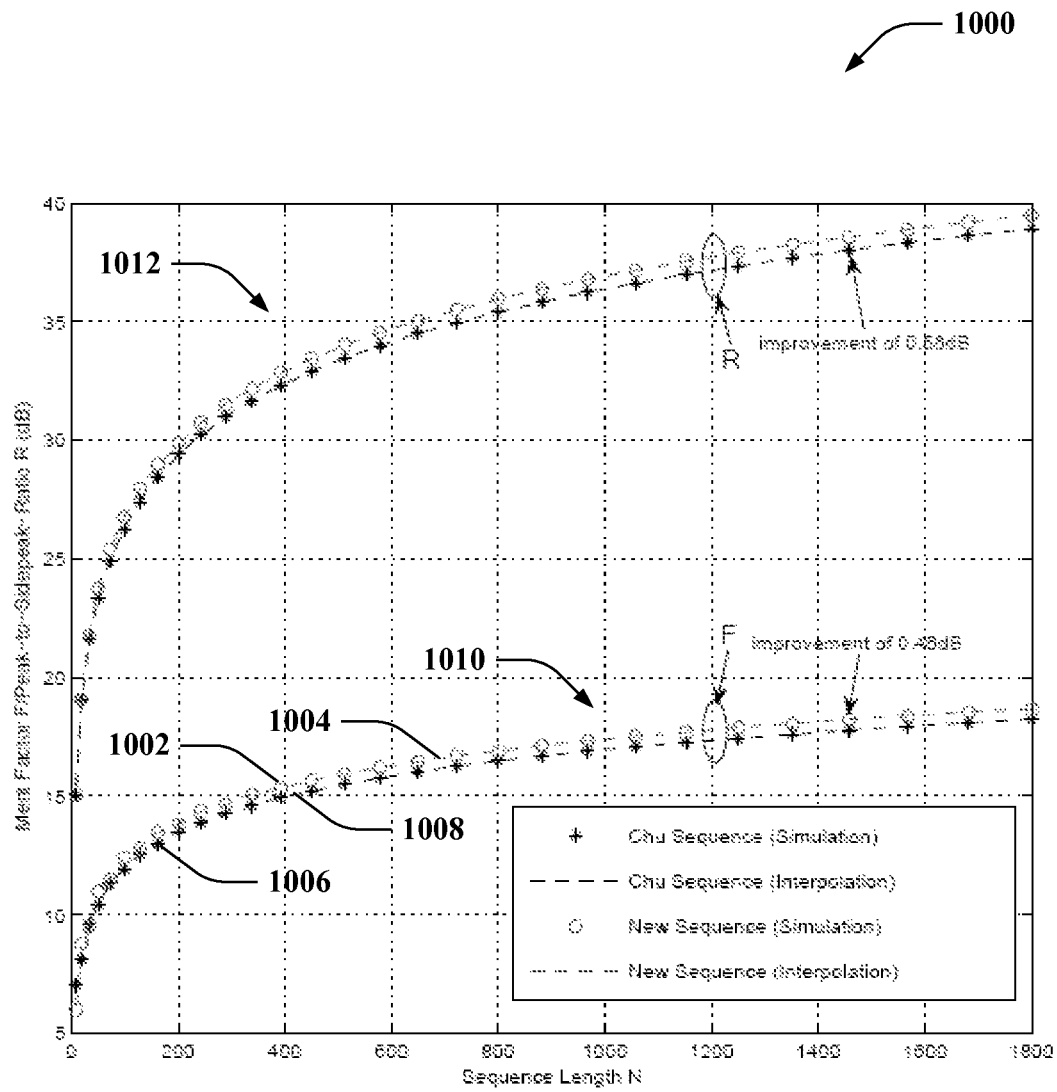
FIG. 10 illustrates an exemplary graph comparing decibel representations of merit factors and peak-to-side-peak ratios of the optimal polyphase sequences presented herein and Chu sequences.

Referring now to FIG. 10, an example graph 1000 is illustrated corresponding to comparing merit factors and peak-to-side-peak ratios of sequences presented herein to conventional Chu sequences expressed in decibels as a function of sequence length L. In this example, the merit factor can be represented by $F_{dB} = 10 \log_{10}(F)$ and peak-to-side-peak ratio by $R_{dB} = 20 \log_{10}(R)$ for each sequence. Similarly to previous figures, the circles 1002 on either the merit factor F curve 1010 or the peak-to-side-peak ratio R curve 1012, represent present sequence simulation results while the lines 1004 on either curve 1010 and/or 1012 represent interpolation results. Moreover, the asterisks 1006 on either curve 1010 or curve 1012 represent simulation results of Chu sequences while the lines 1008 represent corresponding interpolation results as described above. Again, it is shown that the sequences presented herein outperform conventional Chu sequences in merit factor and peak-to-side-peak ratio. In particular, while expressing merit factors in decibel, $F_{dB} \approx 5 \log_{10} L + 10 \log_{10} a_F$ and $R_{dB} \approx 10 \log_{10} L + 20 \log_{10} a_R$, the improvement in decibel can be independent of the sequence length L. For longer sequence lengths, as shown in the graph 1000, improvements in decibel for merit factors F and peak-to-side-peak ratios R for the sequences presented herein can reach and exceed 0.48 dB and 0.59 dB respectively.

Figure 11:
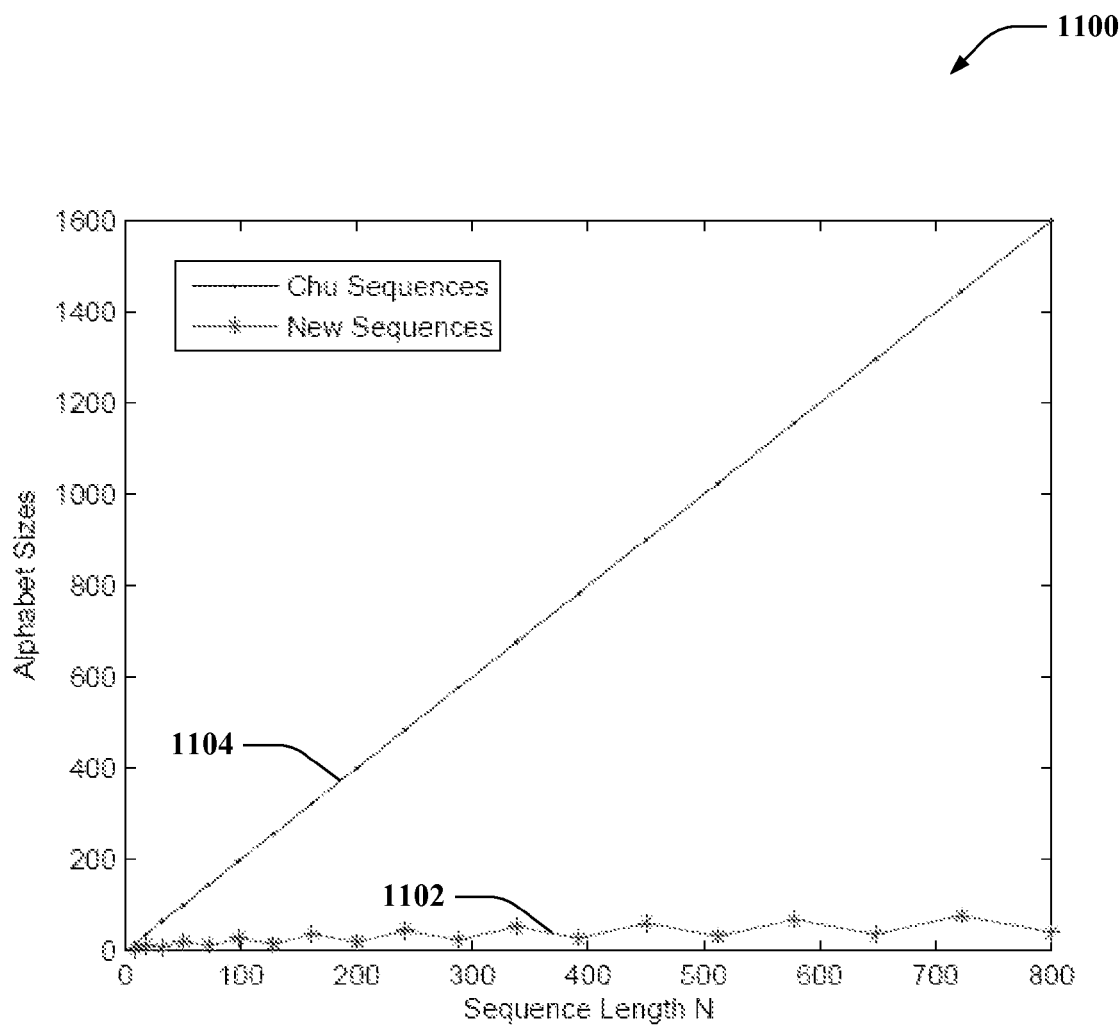
FIG. 11 illustrates an exemplary graph comparing alphabet sizes of the optimal polyphase sequences presented herein and Chu sequences.

Now turning to FIG. 11, an example graph 1100 of resulting alphabet sizes for the optimal sequences presented herein as compared to the conventional Chu sequences to achieve the performance factors above is illustrated. The alphabet size for increasing sequence length L for the sequences presented herein is shown at line 1102, while those for conventional Chu sequences are shown at line 1104. As described previously and shown by the graph 1100, the alphabet size for the sequences presented herein are reduced by a factor of $\sqrt{L/2}$ or $\sqrt{2L}$ in some cases as compared to the Chu sequences. Thus, as the sequence length increases, the difference in required alphabet sizes of the sequences presented herein and Chu sequences is apparent. The reduced alphabet sizes, as mentioned previously, can result in easier implementation of the sequences in one or more systems and can also provide room for increasing alphabet sizes to further improve merit factors.

Figure 12:
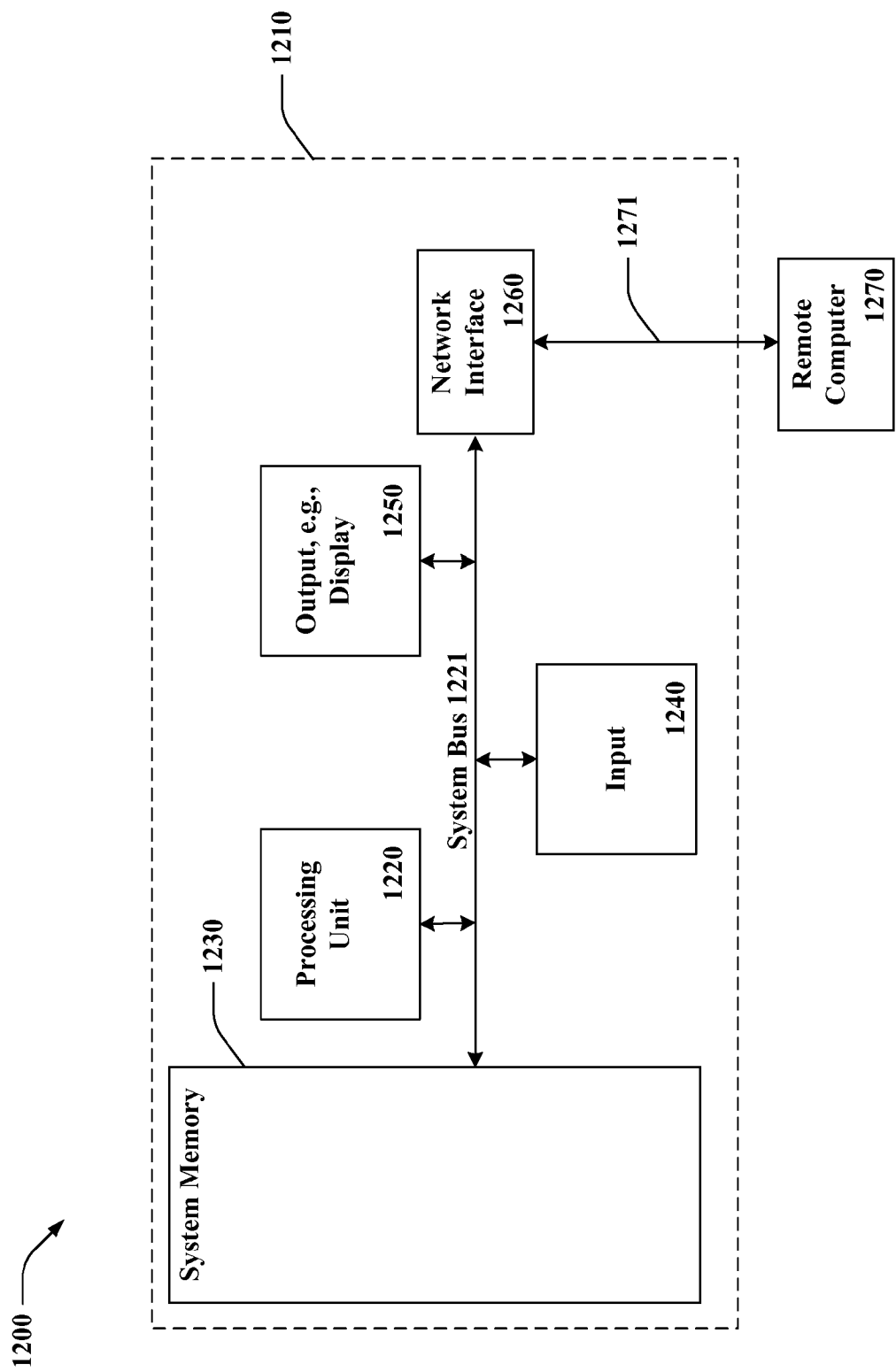
FIG. 12 illustrates a block diagram of an example operating environment in which various aspects described herein can function.

Turning to FIG. 12, an exemplary non-limiting computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a communications system may be desirably configured. Accordingly, the below general purpose remote computer described below is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer executable instructions, such as program modules, being executed by one or more computers, such as client workstations, servers or other devices. Those skilled in the art will appreciate that the claimed subject matter can also be practiced with other computer system configurations and protocols.

FIG. 12 thus illustrates an example of a suitable computing system environment 1200 in which the claimed subject matter can be implemented, although as made clear above, the computing system environment 1200 is only one example of a suitable computing environment for a media device and is not intended to suggest any limitation as to the scope of use or functionality of the claimed subject matter. Further, the computing environment 1200 is not intended to suggest any dependency or requirement relating to the claimed subject matter and any one or combination of components illustrated in the example operating environment 1200.

With reference to FIG. 12, an example of a remote device for implementing various aspects described herein includes a general purpose computing device in the form of a computer 1210. Components of computer 1210 can include, but are not limited to, a processing unit 1220, a system memory 1230, and a system bus 1221 that couples various system components including the system memory 1230 to the processing unit 1220. The system bus 1221 can be any of several types of bus structures including a memory bus or memory controller, a peripheral bus, and a local bus using any of a variety of bus architectures.

Computer 1210 can include a variety of computer readable media. Computer readable media can be any available media that can be accessed by computer 1210. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media can embody computer readable instructions, data structures, program modules or other data in a modulated data signal such as a carrier wave or other transport mechanism and can include any suitable information delivery media.

The system memory 1230 can include computer storage media in the form of volatile and/or nonvolatile memory such as read only memory (ROM) and/or random access memory (RAM). A basic input/output system (BIOS), containing the basic routines that help to transfer information between elements within computer 1210, such as during start-up, can be stored in memory 1230. Memory 1230 can also contain data and/or program modules that are immediately accessible to and/or presently being operated on by processing unit 1220. By way of non-limiting example, memory 1230 can also include an operating system, application programs, other program modules, and program data.

The computer 1210 can also include other removable/non-removable, volatile/nonvolatile computer storage media. For example, computer 1210 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1221 through a non-removable memory interface such as an interface, and a magnetic disk drive or optical disk drive can be connected to the system bus 1221 by a removable memory interface, such as an interface.

A user can enter commands and information into the computer 1210 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1220 through user input 1240 and associated interface(s) that are coupled to the system bus 1221, but can be connected by other interface and bus structures, such as a parallel port, game port or a universal serial bus (USB). A graphics subsystem can also be connected to the system bus 1221. In addition, a monitor or other type of display device can be connected to the system bus 1221 via an interface, such as output interface 1250, which can in turn communicate with video memory. In addition to a monitor, computers can also include other peripheral output devices, such as speakers and/or a printer, which can also be connected through output interface 1250.

The computer 1210 can operate in a networked or distributed environment using logical connections to one or more other remote computers, such as remote computer 1270, which can in turn have media capabilities different from device 1210. The remote computer 1270 can be a personal computer, a server, a router, a network PC, a peer device or other common network node, and/or any other remote media consumption or transmission device, and can include any or all of the elements described above relative to the computer 1210. The logical connections depicted in FIG. 12 include a network 1271, such local area network (LAN) or a wide area network (WAN), but can also include other networks/buses. Such networking environments are commonplace in homes, offices, enterprise-wide computer networks, intranets and the Internet.

When used in a LAN networking environment, the computer 1210 is connected to the LAN 1271 through a network interface or adapter 1260. When used in a WAN networking environment, the computer 1210 can include a communications component, such as a modem, or other means for establishing communications over the WAN, such as the Internet. A communications component, such as a modem, which can be internal or external, can be connected to the system bus 1221 via the user input interface at input 1240 and/or other appropriate mechanism. In a networked environment, program modules depicted relative to the computer 1210, or portions thereof, can be stored in a remote memory storage device. It should be appreciated that the network connections shown and described are exemplary and other means of establishing a communications link between the computers can be used.

Figure 13:
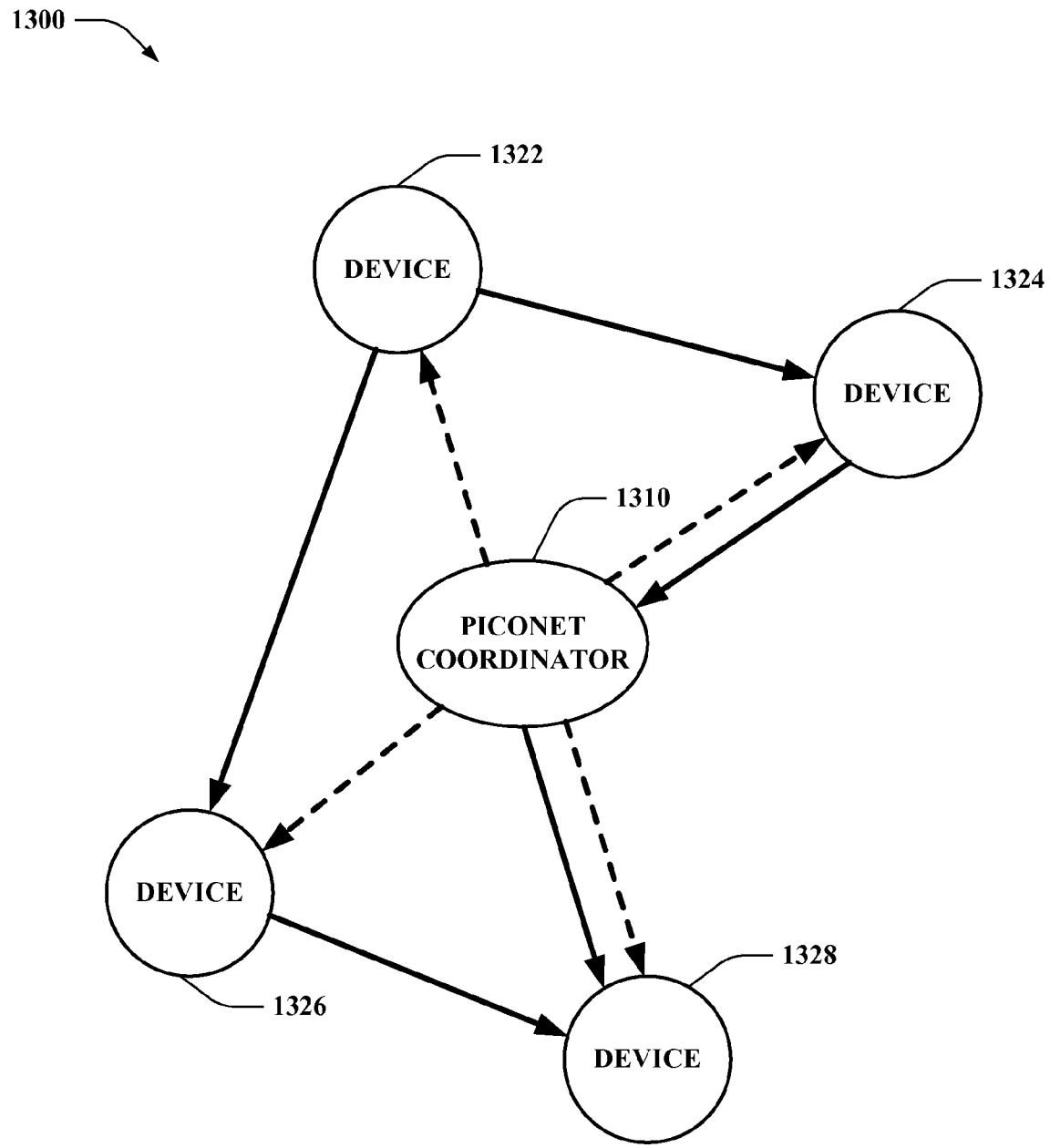
FIG. 13 illustrates an example wireless communication network in which various aspects described herein can be utilized.
Figure 14:
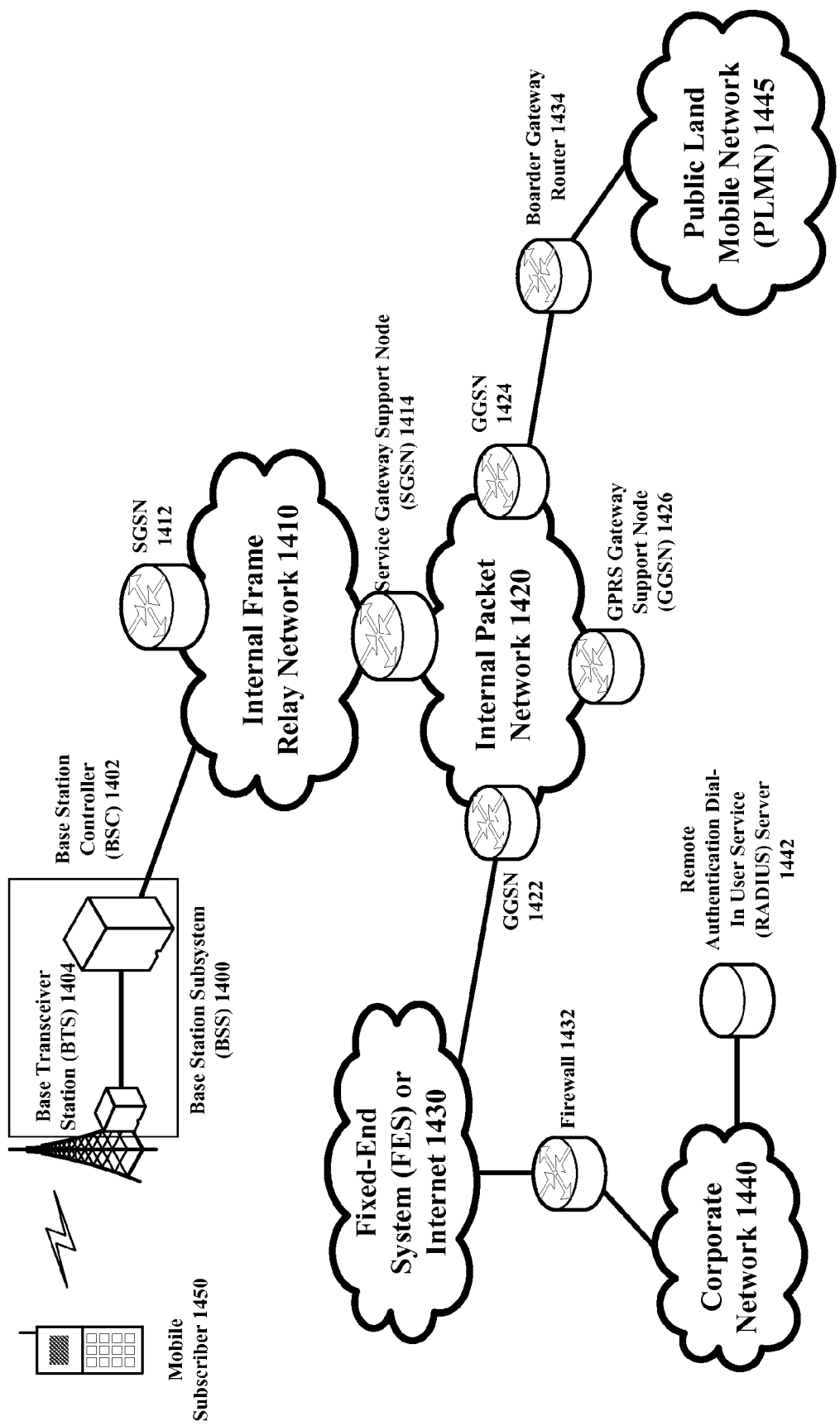
FIG. 14 illustrates an overview of a wireless network environment suitable for service by various aspects described herein.

Turning now to FIGS. 13-14, an overview of network environments in which the claimed subject matter can be implemented is illustrated. The above-described systems and methodologies can be applied to any wireless communication network; however, the following description sets forth some exemplary, non-limiting operating environments for said systems and methodologies. The below-described operating environments should be considered non-exhaustive, and thus the below-described network architectures are merely examples of network architectures into which the claimed subject matter can be incorporated. It is to be appreciated that the claimed subject matter can be incorporated into any now existing or future alternative communication network architectures as well.

Referring first to FIG. 13, a wireless personal area network (WPAN) architecture 1300 based on the IEEE 802.15.3 high data rate WPAN standard is illustrated. Based on the IEEE 802.15.3 standard, the WPAN architecture 1300 can include one or more piconets. As used herein, a piconet is an ad hoc network of independent data devices 1310-1328 that can engage in peer-to-peer communication. FIG. 13 illustrates one such piconet. In one example, the range of a piconet is confined to a personal area of, for example, 10 to 50 meters, although a piconet can alternatively provide coverage for a larger or smaller coverage area.

In accordance with one aspect, a piconet can be established by a device 1310 that is capable of becoming a piconet coordinator (PNC). The device 1310 can establish the piconet by scanning a set of available communication channels (e.g., communication channels corresponding to time frequency codes in an MB-OFDM communication environment) for a channel having a least amount of interference that is not in use by neighboring piconets. Once such a communication channel is found, the device 1310 can become a PNC and begin transmitting control messaging in the form of beacons to allow other devices 1322-1328 to connect to the piconet. As illustrated in architecture 1300, beacons transmitted by PNC 1310 are shown by dotted lines.

Once a PNC 1310 establishes a piconet, one or more devices 1322-1328 can associate with the PNC 1310 based on beacons transmitted by the PNC 1310. In one example, beacons provided by a PNC 1310 can provide timing information, and a device 1322-1328 can perform one or more timing synchronization techniques based on received beacons as described supra while associating with the piconet coordinated by the PNC 1310. In addition, beacons transmitted by the PNC 1310 can also contain information relating to quality of service (QoS) parameters, time slots for transmission by devices 1322-1328 in the piconet, and/or other suitable information. After a device 1322-1328 has successfully associated with the piconet, it can then communicate in the piconet by transmitting data to the PNC 1310 and/or one or more other devices 1322-1328 in the piconet. As illustrated in architecture 1300, data transmissions are indicated by solid lines.

In accordance with one aspect, the PNC 1310 and devices 1322-1328 can additionally communicate using ultra-wideband (UWB) communication. When UWB is used, the PNC 1310 and/or devices 1322-1328 can communicate beacons and/or data using short-duration pulses that span a wide range of frequencies. In one example, transmissions made pursuant to UWB can occupy a spectrum of greater than 20% of a center frequency utilized by the network or a bandwidth of at least 500 MHz. Accordingly, UWB transmissions can be conducted using a very low power level (e.g., approximately 0.2 mW), which can allow UWB transmission to be conducted in common bands with other forms of communication without introducing significant interference levels. Because UWB operates at a low power level, it should be appreciated that UWB is typically confined to a small coverage area (e.g., approximately 10 to 100 meters), which can correspond to the coverage area of an associated piconet. However, by transmitting in short radio bursts that span a large frequency range, devices utilizing UWB can transmit significantly large amounts of data without requiring a large amount of transmit power. Further, because of the large bandwidth range and low transmit power used in UWB transmission, signals transmitted utilizing UWB can carry through obstacles that can reflect signals at lower bandwidth or higher power.

Turning now to FIG. 14, various aspects of the global system for mobile communication (GSM) are illustrated. GSM is one of the most widely utilized wireless access systems in today's fast growing communications systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the timing synchronization techniques described herein may be applied independently of the method of data transport, and does not depend on any particular network architecture or underlying protocols.

FIG. 14 depicts an overall block diagram of an exemplary packet-based mobile cellular network environment, such as a GPRS network, in which the claimed subject matter can be practiced. Such an environment can include a plurality of Base Station Subsystems (BSS) 1400 (only one is shown), each of which can comprise a Base Station Controller (BSC) 1402 serving one or more Base Transceiver Stations (BTS) such as BTS 1404. BTS 1404 can serve as an access point where mobile subscriber devices 1450 become connected to the wireless network. In establishing a connection between a mobile subscriber device 1450 and a BTS 1404, one or more timing synchronization techniques as described supra can be utilized.

In one example, packet traffic originating from mobile subscriber 1450 is transported over the air interface to a BTS 1404, and from the BTS 1404 to the BSC 1402; the traffic can be transported using the polyphase sequences as described herein, in one example. Base station subsystems, such as BSS 1470, are a part of internal frame relay network 1410 that can include Service GPRS Support Nodes ("SGSN") such as SGSN 1412 and 1414. Each SGSN is in turn connected to an internal packet network 1420 through which a SGSN 1412, 1414, etc., can route data packets to and from a plurality of gateway GPRS support nodes (GGSN) 1422, 1424, 1426, etc. As illustrated, SGSN 1414 and GGSNs 1422, 1424, and 1426 are part of internal packet network 1420. Gateway GPRS serving nodes 1422, 1424 and 1426 can provide an interface to external Internet Protocol ("IP") networks such as Public Land Mobile Network ("PLMN") 1445, corporate intranets 1440, or Fixed-End System ("FES") or the public Internet 1430. As illustrated, subscriber corporate network 1440 can be connected to GGSN 1422 via firewall 1432; and PLMN 1445 can be connected to GGSN 1424 via boarder gateway router 1434. The Remote Authentication Dial-In User Service ("RADIUS") server 1442 may also be used for caller authentication when a user of a mobile subscriber device 1450 calls corporate network 1440.

Generally, there can be four different cell sizes in a GSM network—macro, micro, pico, and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

The claimed subject matter has been described herein by way of examples. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Additionally, the disclosed subject matter can be implemented as a system, method, apparatus, or article of manufacture using standard programming and/or engineering techniques to produce software, firmware, hardware, or any combination thereof to control a computer or processor based device to implement aspects detailed herein. The terms "article of manufacture," "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, according to various permutations and combinations of the foregoing. Sub-components can also be implemented as components communicatively coupled to other components rather than included within parent components, e.g., according to a hierarchical arrangement. Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

What is claimed is:

1. A non-transitory computer readable storage medium storing computer-executable instructions that, in response to execution, cause an apparatus including a processor to perform operations, comprising:
   constructing polyphase perfect root of unity sequences (PRUS); and
   applying at least one of the polyphase PRUS to data for transmission of the data.

2. The non-transitory computer readable storage medium of claim 1, wherein the operations further comprise:
   determining merit factors or peak-to-side-peak ratios of the polyphase PRUS.

3. The non-transitory computer readable storage medium of claim 2, wherein the determining includes determining that the merit factors or the peak-to-side-peak ratios of the polyphase PRUS outperform Chu sequences.

4. The non-transitory computer readable storage medium of claim 1, wherein the operations further comprise:
   in response to the applying the at least one of the polyphase PRUS, initiating the transmission of the data to at least one device.

5. The non-transitory computer readable storage medium of claim 1, wherein the operations further comprise:
   applying the at least one of the polyphase PRUS to a header of the data to differentiate the data from other data.

6. The non-transitory computer readable storage medium of claim 1, wherein the constructing comprises:
   accepting input parameters according to a defined length or an alphabet size for the polyphase PRUS.

7. The non-transitory computer readable storage medium of claim 1, wherein the polyphase PRUS are of length $L=sm^2$ where s and m are positive integers.

8. A system, comprising:
   means for searching a plurality of perfect root of unity sequences (PRUS);
   means for determining a PRUS from the plurality of PRUS that determines a merit factor defined as a ratio of main sidelobe energy to total sidelobe energy; and
   means for conveying data as a function of the PRUS.

9. The system of claim 8, wherein the means for searching comprises:
   means for factoring at least one invariant operation characteristic of the plurality of PRUS to reduce a number of PRUS searched.

10. The system of claim 8, wherein the means for searching comprises:
    means for searching within a maximum length $L=sm^2$ where s and m are positive integers to bound a search space associated with the plurality of PRUS.

11. A non-transitory computer readable storage medium storing computer-executable instructions that, in response to execution, cause a system including a processor to perform operations, comprising:
    selecting a polyphase sequence from a set of generated perfect root of unity sequences (PRUS);
    associating the polyphase sequence with a signal; and
    causing the signal to be transmitted to at least one device.

12. The non-transitory computer readable storage medium of claim 11, wherein the operations further comprise:
    receiving the signal rebounded from the at least one device; and
    determining device information based at least in part on the signal.

13. The non-transitory computer readable storage medium of claim 11, wherein the operations further comprise:
    modulating the signal with the polyphase sequence; and
    associating the polyphase sequence with the signal in response to the modulating.

14. The non-transitory computer readable storage medium of claim 11, wherein the associating comprises:
    selecting disparate sequences in the set of generated PRUS that map to values of the signal, wherein the disparate sequences are represented in the signal.

15. The non-transitory computer readable storage medium of claim 11, wherein the selecting comprises:
    searching for at least one PRUS that has a merit factor or a peak-to-side-peak ratio that satisfies a condition; and
    selecting the at least one PRUS that satisfies the condition.

16. The non-transitory computer readable storage medium of claim 11, wherein the selecting comprises:
    selecting the polyphase sequence from the set of generated PRUS that are of length $L=sm^2$ where s and m are positive integers.

17. The non-transitory computer readable storage medium of claim 16, wherein the operations further comprise:
    accepting an input parameter defining L or m.

18. A system, comprising:
    means for generating at least one polyphase sequence that has an alphabet size lower than a Chu sequence; and
    means for transmitting the at least one polyphase sequence in a communication to a device.

19. The system of claim 18, wherein the means for transmitting comprises:
    means for using a sidelobe energy level determined to be lower than a Chu sequence sidelobe energy level.

20. The system of claim 18, further comprising:
    means for constructing a signal from the at least one polyphase sequence and including the signal in the communication.

* * * * *